United States Patent [19]

Brilando et al.

[11] 3,947,070
[45] Mar. 30, 1976

[54] BICYCLE WHEEL REFLECTOR

[75] Inventors: Frank P. Brilando, Niles; Sidney A. Heenan, Park Ridge; Rudolph L. Schwinn, Niles; Jay S. Waxman, Skokie, all of Ill.

[73] Assignee: Schwinn Bicycle Company, Chicago, Ill.

[22] Filed: Dec. 26, 1974

[21] Appl. No.: 536,623

Related U.S. Application Data

[63] Continuation of Ser. No. 488,288, July 15, 1974, abandoned.

[52] U.S. Cl. .......... 301/37 SA; 40/129 B; 301/37 R
[51] Int. Cl.² ............................................ B60B 7/00
[58] Field of Search ...... 301/37 R, 37 SA; 40/129 B

[56] References Cited
UNITED STATES PATENTS

| 2,621,081 | 12/1952 | Mann | 301/37 SA |
| 3,834,765 | 9/1974 | Trimble | 301/37 R |

Primary Examiner—Allen N. Knowles
Assistant Examiner—D. W. Keen

[57] ABSTRACT

A bicycle wheel assembly having a safety reflector stably supported between three adjacent spokes parallel to the plane of rotation of the wheel. The reflector has a flat body with retroreflective surfaces on opposite side portions and may, as in the embodiment illustrated, have margins curved to fit the contour of the wheel rim. One of the side portions has a spoke-receiving groove for receiving and fastening to the middle one of the three adjacent spokes. The reflector is positioned in a V-shaped cage defined by the spokes and rim in such a way that the grooved surface of the reflector abuts against a selected spoke. Further, the groove is diagonal in two directions to match the standard, non-radial inclination of the spoke. In the embodiment which is illustrated in the drawings for standard 27 inch wheels, the groove is inclined 7° from the plane of rotation and 5° from a radial line in that plane of rotation and the outer margin is curved along a 12¼ inch radius arc. With these specific dimensions, the reflector may be assembled on a 27 inch wheel with the outer margin abutting the ends of the nipples for the three spokes involved. For other sizes of wheels, the outer margin will be symmetrical, that is, its ends will be equally spaced, with respect to the wheel rim. The reflector is held in place by a single bolt extending through the body. The bolt is threadedly engaged with a clamp having a flange with a spoke-receiving recess aligned with the spoke-receiving groove in the body. This holds the reflector firmly on the middle spoke while preventing rotation about that spoke by wedging engagement with the two adjacent spokes. The opposite retroreflective surfaces are thereby maintained upright and parallel to the plane of rotation and therefore, retroreflect light effectively and uniformly to cross traffic in both directions.

25 Claims, 6 Drawing Figures

U.S. Patent  March 30, 1976  3,947,070
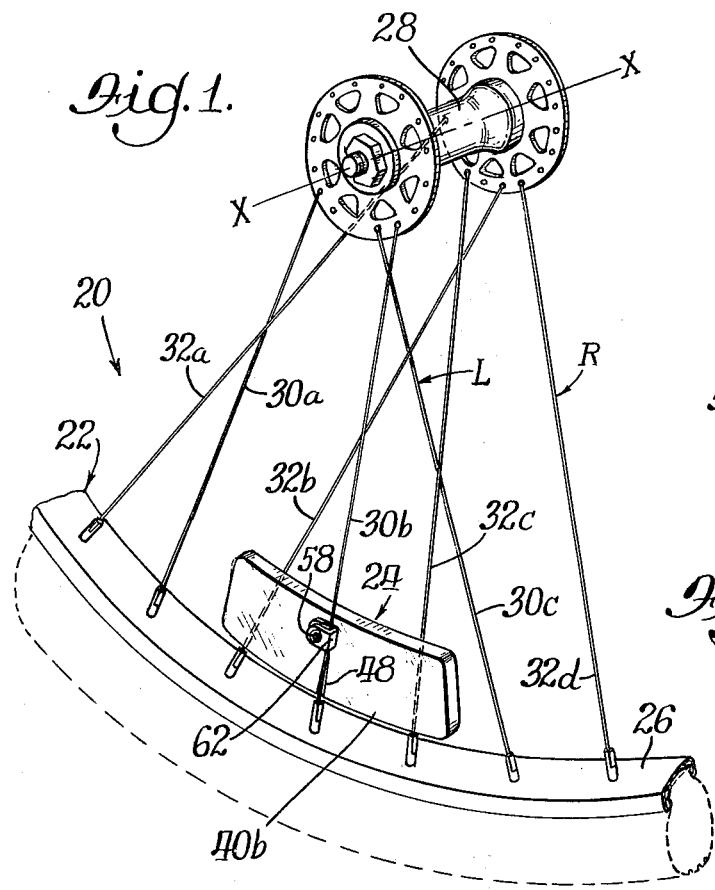
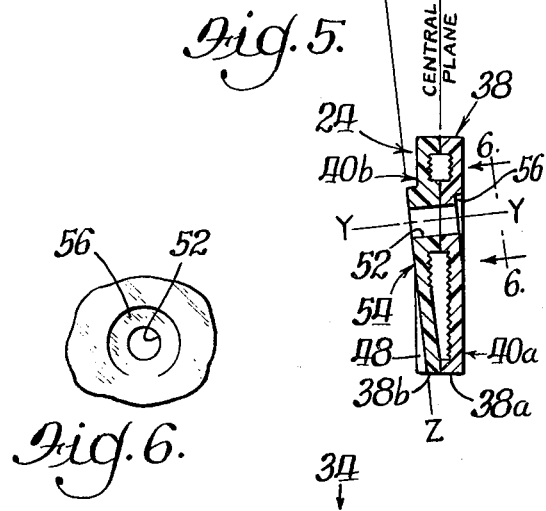
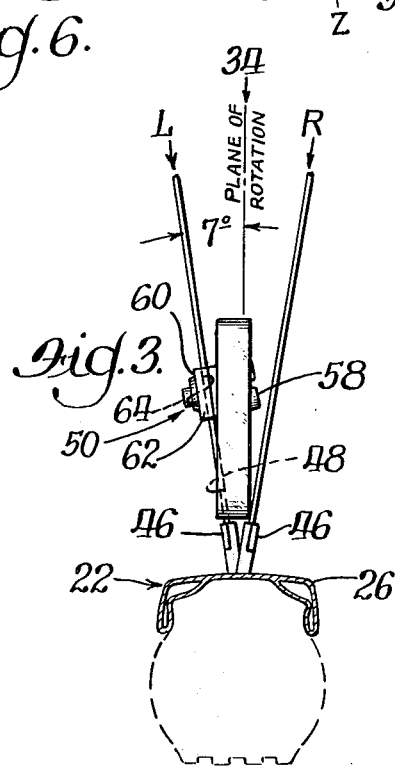
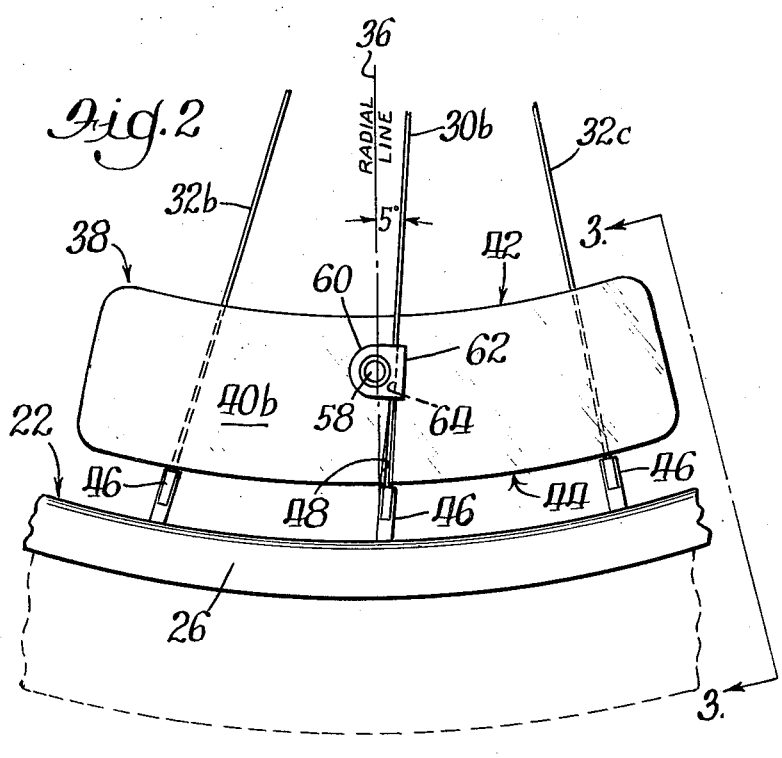
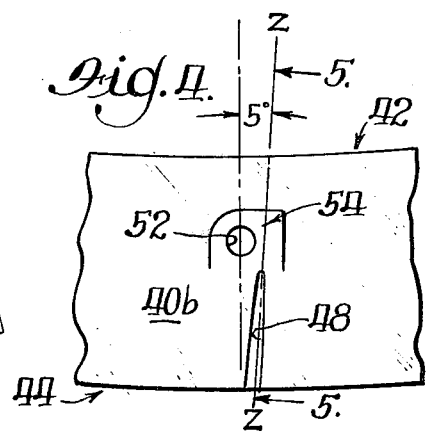

BICYCLE WHEEL REFLECTOR

This application is a continuation of Ser. No. 488,288 filed July 15, 1974, now abandoned.

BACKGROUND OF THE INVENTION

The field of art to which the invention pertains is that of bicycle wheel reflectors in U.S. Patent Office Classification 301/37R.

Reflectors having opposite side reflecting surfaces are desirable on bicycle wheels so the headlights of cross traffic can readily detect a cyclist by retroreflection from a motor vehicle's headlights.

Many conventional bicycle wheel reflectors have simple bolt or screw connections to the spokes. However, because these spokes are non-radially and diagonally disposed relative to the wheel plane of rotation, and the mounting means do not take this into account, the conventional reflectors as assembled on the wheels are angularly disposed. For example, see Fike U.S. Pat. No. 2,344,542, Lindner U.S. Pat. No. 3,781,082 and Kennedy U.S. Pat. No. 3,820,852. One disadvantage of this angular disposition is that they do not retroreflect light uniformly to both sides. And the angular disposition on the wheel detracts from the appearance.

A preferred disposition would be for the reflector to be mounted upright on the wheel, that is with the opposite reflecting surfaces parallel to the plane of rotation. This would retroreflect light uniformly to both sides and would provide improved appearance. The reflector preferably should be between the spokes to provide maximum protection for it. And it should be easily attachable with a minimum of tools and effort to encourage widespread use.

One example of a design for an upright bicycle wheel reflector is shown in Lindner U.S. Pat. No. 3,809,434; it utilizes a pair of mounting brackets welded to the inside of the rim between a pair of adjacent spokes. This would not be practical for the vast majority of cyclists who have neither welding equipment nor skill.

BRIEF SUMMARY OF THE INVENTION

An important object of the present invention is to provide an improved bicycle wheel reflector which can be easily and permanently mounted by anyone without special tools.

Another object is to provide such a bicycle wheel reflector which can be mounted between the spokes with opposite retroreflective surfaces parallel to the plane of rotation for equal light reflecting ability to both sides.

Another object is to provide a bicycle wheel reflector mounted between three adjacent spokes with the reflector fastened to the middle one of the three spokes and having the middle of one side wedged against that middle spoke while the ends of the opposite side are respectively wedged against the other two spokes to hold it stably in position in the cage like area between the spokes.

An important feature of the present invention is that the body of the bicycle wheel reflector has a diagonal spoke receiving recess in one side matching the inclination of the spoke to which it is attached in directions both parallel to and perpendicular to the wheel plane of rotation so the opposite reflecting surfaces will be upright in use and both surfaces will be parallel to the plane of rotation.

BRIEF DESCRIPTION OF THE DRAWINGS

Other objects and advantages will be apparent from the following description taken in connection with the drawings in which:

FIG. 1 is a fragmentary perspective view of a bicycle wheel assembly including a reflector illustrating a preferred form of the present invention;

FIG. 2 is an enlarged fragmentary side view of FIG. 1;

FIG. 3 is an end view of FIG. 2 as seen in the direction of the arrows 3—3;

FIG. 4 is a fragmentary enlarged view of FIG. 2 showing only a portion of the reflector and with all other parts removed;

FIG. 5 is an upright cross-sectional view of FIG. 4 taken along the lines 5—5; and FIG. 6 is a fragmentary view of FIG. 5 as seen in the direction of arrows 6—6.

Like parts are referred to by like reference characters throughout the figures.

DESCRIPTION OF THE PREFERRED EMBODIMENT

The wheel assembly is generally designated 20. This includes a standard bicycle wheel 22 and the improved bicycle wheel reflector 24.

The wheel 22 has a rim 26 which may for the purposes of the present description be considered a standard 27 inch rim; a hub 28; and spokes connected between the rim and hub. The spokes are arranged in two sets, namely a first set L and a second set R (FIGS. 1 and 3), connected alternately between the rim and opposite ends of the hub. The arrangement of spokes L and R, as just described, defines a spoke cage 37 (FIG. 3), which is generally V-shaped when viewed in a plane perpendicular to the wheel plane 34 which is generally normal to the pavement when the bicycle is ridden. The drawing illustrates spokes 30a, 30b and 30c in set R; and 32a, 32b, 32c and 32d in set L.

The sets of first and second spokes are arranged in a standard diagonal pattern, all alike, except that half of them are canted toward one end of the hub 28 and half of them are canted toward the other end of the hub, as shown for example in FIG. 3. Specifically, referring to spoke 30b, this is inclined at approximately 7° with respect to the plane of rotation of the wheel designated 34 in FIG. 3; and 5° with respect to a radial line 36 as shown in FIG. 2. It will be understood that this radial line 36 is considered to be in the plane of rotation 34, or in a plane parallel to it, and it extends radially from the axis X—X of hub 28.

Referring now to the improved bicycle wheel reflector 24, it comprises a curved, elongated, plate-like body of generally flat configuration and made of molded plastics or other suitable material. In the example illustrated it is generally in the shape of a segment of an annulus. It has a length greater than the arcuate distance between adjacent first spokes L in the general region of the rim to be mountable in the V-shaped cage described. Specifically, in the embodiment illustrated the length of the reflector is approximately equal to the arcuate distance between the outer ends of four successive spokes L and R. "Plexiglas" or "Lucite" brands of clear or colored polymerized methyl methacrylate are suitable. The body 38 may be molded in two portions 38a and 38b continuously welded together by ultrasonic equipment or otherwise suitably fused or adhered together along their peripheries as shown in FIG. 5.

Such continuous welding of the reflector body portions 38a and 38b provides a sealed, dust-free chamber for internal reflective surfaces and makes the assembled reflector body extremely rigid despite the fact that the individual reflector portions are somewhat flexible before they are assembled. This eliminates the need for a frame. The body portions 38a and 38b have planar outer side surfaces 40a and 40b respectively. The inside or back faces 41 and 43 may have integral polygonal facets conventionally used with molded plastics reflex reflectors. These are well known to those skilled in the art and will not be detailed here. By way of example but not by way of limitation, the inside surfaces 41 and 43 may be a multiplicity of retroreflective cube-corner elements molded for wide-angled retroreflectivity as disclosed in Heenan et al. U.S. Pat. No. 3,541,606 issued Nov. 17, 1970. Alternatively, the outer side surfaces 40a and 40b may be coated with a sheet or layer of miniature retroreflective spherical lens elements such as for example material marketed by the 3M Company under the trademark "SCOTCHLITE". The body is bounded along its length by inner and outer marginal edges 42 and 44 which are curved to match the contour of the rim. Specifically, in the present case, both of these marginal edges are along arcs struck from the wheel axis X—X but this specific contour is not essential to practicing the present invention. Both edges 42 and 44 may be struck from other points along the radial line 36; alternatively, they may have other shapes not necessarily related to a radial line. Preferably, however, they should be symmetrical with respect to the rim, that is the ends should be equidistant from the rim, for the best appearance. In the example shown utilizing a standard 27 inch rim, the radius of the outer marginal edge 44 is 12¼ inches enabling it to abut the inner ends of spoke nipples 46 when the reflector is wedged against the three spokes as shown in FIGS. 1, 2 and 3.

Body side portion 38b has a spoke-receiving groove 48 in the outer portion thereof. This is about half the radial width of surface 40b and is diagonally inclined to correspond with the inclinations of spoke 30b in directions parallel and perpendicular to the wheel plane of rotation 34 described above and gradually increases in depth outward from the midpoint of the reflector side 40b to the outer marginal edge 44. Specifically, looking at FIG. 5, the angle of inclination of the groove 48 is 7° with respect to the central plane C of the reflector body, just as the spoke 30b is inclined at 7° with respect to the plane of rotation 34 as shown in FIG. 3—it being understood that when assembled and in use the central plane C and the plane of rotation 34 are either substantially parallel or coincident. And the groove 48 and the spoke 30b are both inclined at 5° with respect to the radial line 36 as shown in FIG. 2.

There is a bolt hole 52 (FIG. 5) through the body 38. This is on an axis Y—Y which is oblique to the central plane C of the reflector body but is preferably perpendicular as shown to a plane parallel to the spoke-receiving groove 48. The bolt hole 52 is offset from but closely adjacent to the axis Z—Z of the spoke-receiving groove 48. The body has parallel flat fastener-supporting annular surfaces 54 and 56 (FIGS. 4 and 5) at opposite ends of the bolt hole. The surface 54 is ramp-like on the boss or projection 53 and it is aligned with groove 48. This ramp-like surface 54 has a slope substantially the same as that of the groove 48. Because the slope of groove 48 is substantially equal to the slope of the spoke 30b relative to the wheel plane 34, the reflector portions 38a and 38b will be substantially vertical in use.

A bolt 58 extends through the bolt hole 52 and has its head seated on surface 56. At the other side the threaded bolt shank is engaged with the clamp 60, seated on the opposite ramp-like surface 54. The clamp has a flange 62 with a spoke-receiving recess 64 in the underside aligned with the spoke-receiving groove 48 in the body. By tightening the bolt 58 with a screwdriver or even with a coin, the recessed underside of the clamp flange 62 may be pressed tightly against the spoke 30b to hold the reflector firmly in place. By reason of the fact that the angles of inclination of the groove 48 match those of the middle supporting spoke 30b, the reflector is supported symmetrically with respect to the rim, that is with both ends being substantially the same distance from the rim regardless of any differences in concentricity of the reflector body and the rim. And the inner and outer surfaces of the reflector body portions 38a and 38b are parallel to the plane of rotation 34 to provide the same outwardly directed light retroreflecting ability toward both sides of the wheel for maximum safety.

Thus, when so assembled on the wheel, the reflector is protected within the generally V-shaped cage 37 defined on the one side by two successive "first" spokes 32b and 32c, and defined on the other side by a "second" spoke 30b. In addition to the above-described bolted support on middle spoke 30b, the position of the reflector is stabilized on, and supported against rotation about, spoke 30b by the fact that its outer marginal edge is wedged between the three spokes.

While one preferred embodiment of the invention has been shown and described, it will be understood that various modifications may be made within the spirit and scope of the invention which therefore should be limited only by the appended claims.

The embodiments of the invention in which an exclusive property or privilege is claimed are defined as follows:

1. A bicycle wheel reflector comprising:
   an elongated body extending along a central plane, said body having opposite side portions with light-reflective side surfaces on opposite sides of said plane, said body being bounded along the length thereof by a pair of marginal edges at least the outer one of which is symmetrical with respect to a radial line in said central plane;
   said body having a spoke-receiving groove in one of said side portions which is diagonally disposed to correspond with the angle of a spoke on a bicycle wheel both with respect to the plane of rotation of the bicycle wheel and with respect to a radial line extending from the bicycle wheel axle in said plane of rotation, enabling said body to be assembled on the bicycle wheel with said groove engaging said spoke and said body symmetrically positioned with respect to the rim of the bicycle wheel and with said central plane of the body parallel to said plane of rotation; and
   bolt means extending through a bolt hole in said body for holding said spoke within said spoke-receiving groove to thereby assemble said reflector on the wheel.

2. A bicycle wheel reflector according to claim 1 in which at least said outer one of said pair of marginal edges is curved to follow the rim of the bicycle wheel.

3. A bicycle wheel reflector according to claim 2 in which said outer one of said pair of marginal edges is curved along an arc having a radius of approximately 12¼ inch and is of sufficient circumferential length to bear against the inner ends of a plurality of spoke nipples to stabilize its position when assembled on a standard 27 inch bicycle wheel.

4. A bicycle wheel reflector according to claim 1 in which said marginal edges of said body are curved along arcs struck from said radial line.

5. A bicycle wheel reflector according to claim 1 in which said spoke-receiving groove is inclined at approximately five degrees with respect to said radial line and seven degrees with respect to said central plane.

6. A bicycle wheel reflector according to claim 1 in which
   said bolt hole is offset but adjacent the axis of said groove,
   said body has flat fastener-supporting surfaces on opposite sides of said body around said bolt hole, said fastener-supporting surfaces being inclined relative to said side portions and being parallel to said axis,
   said bolt means includes a bolt extending through said bolt hole having a head seated on said fastener-supporting surface on the side of the body opposite said groove, and
   a clamp is seated on the other of said fastener-supporting surfaces threadedly engaged with said bolt, said clamp having a flange with a spoke-receiving recess aligned with said spoke-receiving groove in the body to retain said body on a spoke extending through said groove and recess and parallel to the plane of rotation of the wheel.

7. In a bicycle wheel assembly rotatable in a plane of rotation:
   a wheel including a hub, a rim, and spoke means extending alternately between the rim and opposite ends of the hub;
   said spoke means including two sets of spokes, one on each side of the wheel, each of said spokes extending diagonally with respect to the plane of rotation and with respect to a radial line extending from the hub in said plane of rotation;
   a reflector extending along said plane of rotation between said sets of spokes and having an elongated body of sufficient arcuate length to engage three successive spokes;
   said body having opposite retroreflective side portions on opposite sides of said plane of rotation, said body being bounded along the length thereof by a pair of marginal edges which are symmetrical with respect to said radial line;
   said body having a groove in one of said side portions which extends in the direction of the middle spoke of said three successive spokes, said middle spoke being recessed within said groove, and the other two spokes respectively engaging opposite ends of the other side portion of the body; and
   bolt means extending through said body including means engaging said middle spoke to hold it within said groove and thereby retain said body on the wheel in a position which is substantially parallel to the plane of rotation and retroreflects light equally toward both sides of the wheel assembly.

8. Safety reflector structure for mounting on a spoked wheel including a hub, a rim, and alternating first and second spokes interconnecting the hub and the rim, the first spokes being attached to one side of the hub and the second spokes being attached to the other side of the hub, thereby to create a generally V-shaped cage between the first and second spokes when viewed in radial section, said reflector structure comprising a plate-like reflector having retroreflective elements for retroreflecting light incident thereon, said reflector having a length greater than the arcuate distance between adjacent first spokes in the general region of the rim, whereby said reflector is mountable in the portion of the V-shaped cage defined by a selected second spoke and two successive first spokes immediately adjacent thereto, said reflector having a thickness to be wedged against the selected second spoke and said two first spokes, said reflector having a diagonal spoke-receiving groove disposed to correspond with the angle of said selected second spoke to stabilize the reflector in operation, and means for attaching said reflector only to the selected second spoke.

9. The reflector structure of claim 8, wherein said reflector is elongated.

10. The reflector structure of claim 8, wherein the length of said reflector is approximately equal to the arcuate distance between outer ends of four successive spokes.

11. The reflector structure of claim 8, wherein said reflector has the shape of a segment of an annulus.

12. The reflector structure of claim 8, wherein said reflector has a thickness to be wedged against the selected second spoke and the two first spokes immediately adjacent thereto at a radial position substantially nearer the rim than the hub.

13. The reflector structure of claim 8, and further comprising a projection on said reflector, said projection having a ramp-like surface with a slope substantially the same as the inclination of the selected second spoke relative to the plane of the wheel, whereby said reflector structure is disposed and maintained substantially parallel to the wheel plane when mounted on the wheel.

14. In combination with a spoked wheel including a hub, a rim, and alternating first and second spokes interconnecting the hub and the rim, the first spokes being attached to one side of the hub and the second spokes being attached to the other side of the hub, thereby to create a generally V-shaped cage between the first and second spokes when viewed in radial section, reflector structure comprising a plate-like reflector having retroreflective elements for retroreflecting light incident thereon, said reflector having a length greater than the arcuate distance between adjacent first spokes in the general region of the rim, whereby said reflector is mountable in the portion of the V-shaped cage defined by a selected second spoke and two successive first spokes immediately adjacent thereto, said reflector having a diagonal spoke-receiving groove corresponding with the angle of and receiving said selected second spoke, said reflector having a sufficient thickness for wedging engagement against the selected second spoke and said two first spokes, and means for attaching said reflector only to the selected second spoke.

15. Reflector structure for mounting on a wheel including a hub, a rim, and alternating first and second spokes interconnecting the hub and the rim, the first spokes being attached to one side of the hub and the second spokes being attached to the other side of the hub, thereby to create a generally V-shaped cage between the first and second spokes when viewed in radial section, said reflector structure comprising an elongated plate-like reflector having retroreflective elements for retroreflecting light incident thereon, said reflector having a length greater than the arcuate distance between adjacent first spokes in the general region of the rim, whereby said reflector is mountable in the portion of the V-shaped cage defined by a selected second spoke and the two first spokes immediately adjacent thereto, said reflector having opposing first and second surfaces and a transversely extending groove in said first surface to receive the selected second spoke, said groove being diagonally disposed to correspond with the angle of said selected second spoke both with respect to the plane of rotation of the wheel and with respect to a radial line extending from the hub in said plane of rotation, said groove being spaced from said second surface a distance to enable said reflector to be wedged against the selected second spoke and the two first spokes immediately adjacent thereto with the selected second spoke received in said groove, and fastening means for attaching said reflector only to the selected second spoke.

16. The reflector structure of claim 15, wherein said groove has a length of about one half the width of said first surface.

17. The reflector structure of claim 15, wherein said groove extends approximately from the transverse midpoint of said first surface to one edge of said reflector.

18. The reflector structure of claim 15, wherein said reflector has a hole therethrough slightly longitudinally spaced from said groove, and said fastening means includes a bolt passing through said hole and a clamp threadedly engaging said bolt and adapted to engage the selected second spoke.

19. The reflector structure of claim 15, wherein the depth of said groove gradually increases from said midpoint to said one edge, the slope of said groove being substantially the same as the inclination of the selected second spoke relative to the plane of the wheel, whereby said first surface is parallel to the wheel plane when said reflector is mounted on the wheel.

20. The reflector structure of claim 19, and further comprising a projection on said first surface, said projection having a ramp-like surface aligned with said groove and having a slope substantially the same as the slope of said groove, the selected second spoke contacting said ramp-like surface in use and being secured thereto.

21. Reflector structure for mounting on a wheel including a hub, a rim, and alternating first and second spokes interconnecting the hub and the rim, the first spokes being attached to one side of the hub and the second spokes being attached to the other side of the hub, thereby to create a generally V-shaped cage between the first and second spokes when viewed in radial section, said reflector structure comprising first and second elongated plate-like reflector members, each of said reflector members being constructed of transparent material and having a light-receiving front surface and a back made up of a multiplicity of retroreflective cube-corner elements, said plate-like reflector members being permanently secured to each other back to back to provide an elongated reflector having substantially parallel light-receiving opposed front surfaces and being capable of retroreflection of incident light from opposite directions, said elongated reflector having a length greater than the arcuate distance between adjacent first spokes in the general region of the rim, whereby said reflector is mountable in the portion of the V-shaped cage defined by a selected second spoke and the two first spokes immediately adjacent thereto, said elongated reflector having in one of said opposed front surfaces a diagonal spoke-receiving groove corresponding with the angle of said selected second spoke both with respect to the plane of rotation of the wheel and with respect to a radial line extending from the hub in said plane of rotation, said reflector having a thickness to be wedged against the selected second spoke and the two first spokes immediately adjacent thereto with the selected second spoke received in said groove to support said opposed front surfaces in substantially equal parallelism with respect to said plane of rotation, and means for attaching said reflector only to the selected second spoke.

22. The reflector structure of claim 21, wherein each of said reflector members has a wall extending rearwardly from the associated front surface, said members being secured to each other by a continuous weld between said walls.

23. Reflector structure for mounting on a wheel including a hub, a rim, and alternating first and second spokes interconnecting the hub and the rim, the first spokes being attached to one side of the hub and the second spokes being attached to the other side of the hub, thereby to create a generally V-shaped cage between the first and second spokes when viewed in radial section, said reflector structure comprising a plate-like reflector having retroreflective elements for retroreflecting light incident thereon, said reflector having a length greater than the arcuate distance between adjacent first spokes in the general region of the rim, whereby said reflector is mountable in the portion of the V-shaped cage defined by a selected second spoke and the two first spokes immediately adjacent thereto, said reflector having a thickness to be wedged against the selected second spoke and the two first spokes immediately adjacent thereto, and a bolt passing through said reflector and being constructed and arranged operatively to engage the selected second spoke and thereby attach said reflector thereto.

24. The reflector structure of claim 23, and further comprising a clamp which is engageable with the selected second spoke and threadedly receives said bolt to be tightened thereby.

25. The reflector structure of claim 24, wherein said clamp has a screw engaging portion and a hook portion for hooking onto the selected second spoke.

* * * * *

UNITED STATES PATENT OFFICE
CERTIFICATE OF CORRECTION

PATENT NO. : 3,947,070
DATED : March 30, 1976
INVENTOR(S) : Frank P. Brilando; Rudolph L. Schwinn; Sidney A. Heenan; Jay S. Waxman It is certified that error appears in the above-identified patent and that said Letters Patent are hereby corrected as shown below:

Column 3, line 56, before "There", insert

-- Fastener means holding the reflector to the middle one 30b of the three spokes 30b, 32b and 32c comprises bolt means 50. --

Signed and Sealed this

Thirty-first Day of August 1976

[SEAL]

Attest:

RUTH C. MASON
Attesting Officer

C. MARSHALL DANN
Commissioner of Patents and Trademarks